US012792323B2

(12) United States Patent
Chen et al.

(10) Patent No.: US 12,792,323 B2
(45) Date of Patent: Nov. 10, 2026

(54) RUNTIME CHECK COMPILER OPTIMIZATION

(71) Applicant: INTERNATIONAL BUSINESS MACHINES CORPORATION, Armonk, NY (US)

(72) Inventors: Zheng Chen, Songjiang (CN); Ke Wen Lin, Pudong New District (CN); Jiu Fu Guo, Shanghai (CN); Kai Luo, Shenzhen (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 18/407,670

(22) Filed: Jan. 9, 2024

(65) Prior Publication Data

US 2025/0224938 A1 Jul. 10, 2025

(51) Int. Cl.
*G06F 8/41* (2018.01)

(52) U.S. Cl.
CPC .................................... *G06F 8/434* (2013.01)

(58) Field of Classification Search
CPC ....................................................... G06F 8/434
See application file for complete search history.

(56) References Cited

U.S. PATENT DOCUMENTS 8,166,279 B2 4/2012 Blaner et al.
10,228,621 B2 3/2019 Ramani et al.
12,399,693 B1 * 8/2025 Pohlack ................ G06F 21/577
2003/0204834 A1 * 10/2003 Ball .................... G06F 11/3608 714/38.1
2010/0162219 A1 * 6/2010 Bowler ................. G06F 11/366 717/154
2012/0198428 A1 8/2012 Schmidt
2012/0204163 A1 * 8/2012 Marathe ................ G06F 8/4442 717/151
2015/0286472 A1 * 10/2015 Lim .................... G06F 9/45516 717/151

(Continued)

OTHER PUBLICATIONS

Gamg Zhao, "Improving Static Analysis for Software Security at Compile-Time and Runtime" (Year: 2022).*

(Continued)

*Primary Examiner* — Phillip H Nguyen
(74) *Attorney, Agent, or Firm* — Eric Chesley, Esq.; Heslin Rothenberg Farley & Mesiti P.C.; George S. Blasiak, Esq.

(57) ABSTRACT

Methods, computer program products, and systems are presented. The method computer program products, and systems can include, for instance: performing static analysis of program source code defining a computer program, wherein the computer program comprises a pointer operation callee and at least one caller that can pass a pointer parameter to the pointer operation callee; generating, in dependence on the static analysis of program source code, binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

20 Claims, 13 Drawing Sheets

(56) References Cited

U.S. PATENT DOCUMENTS

| | | | | |
|---|---|---|---|---|
| 2016/0048378 | A1* | 2/2016 | Varma | G06F 8/434 717/141 |
| 2017/0351497 | A1 | 12/2017 | Ramani et al. | |
| 2021/0191700 | A1* | 6/2021 | Gopalasubramanian | G06F 8/4434 |
| 2022/0206958 | A1* | 6/2022 | LeMay | G06F 12/0831 |

OTHER PUBLICATIONS

Martena, Vincenzo et al.; Alias Analysis by Means of a Model Checker; International Conference on Compiler Construction; Apr. 2-6, 2001; pp. 3-19.

Lin, Sheng-Hsiu; Alias Analysis in LLVM; Thesis/Dissertation in Candidacy for the Degree of Master of Science in Computer Science; Lehigh University; May 2015; 43 pages.

Koes, David et al.; Programmer Specified Pointer Independence; Proceedings of the 2004 Workshop on Memory System PerformanceJun. 8, 2004;9 pages.

* cited by examiner

RUNTIME CHECK COMPILER OPTIMIZATION

BACKGROUND

Embodiments herein relate generally to compiling of source code, and specifically to compiling optimization.

Computer systems typically include a combination of computer hardware (such as semiconductors, circuit boards, processors, and storage devices) and computer programs. The computer programs are stored in the storage devices and are executed by the processors. Computers are often general purpose, meaning that the functions that the computer performs on the data may be altered by altering the computer programs that execute on the computer.

Human programmers often write computer programs in a form of computer language, called source code, that is relatively easy for a human to understand, but which is not efficient or possible for the processor to execute. Another program, called a compiler, then transforms or translates the source code into a form, often called object code, which is more efficient or possible for the processor in the computer to execute, but relatively difficult for a human to understand. A compiler may exist as a stand-alone compiler or may be used as part of an interpreter.

A type of compiler, called an optimizing compiler, attempts to analyze the statements or instructions within the program in order to produce object code that will execute faster or use less memory. Techniques for optimizing the object code include avoiding redundancy by reusing results that have already been computed and storing them for later use instead of re-computing them, removing unnecessary computations and intermediate values, placing code and data that are accessed closely together in time close together in memory, re-ordering instructions to allow multiple computations to happen in parallel, combining the body of loops that iterate the same number of times if they make no reference to each other's data, moving calculations that compute the same value for each iteration from inside the loop to outside the loop, and replacing expressions consisting of constants with their final value at compile-time, rather than performing the calculation at run-time, among others.

SUMMARY

Shortcomings of the prior art are overcome, and additional advantages are provided, through the provision, in one aspect, of a method. The method can include, for example: performing static analysis of program source code defining a computer program, where the computer program comprises a pointer operation callee and at least one caller that can pass a pointer parameter to the pointer operation callee; generating, in dependence on the static analysis of program source code, binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

In a further aspect, the method can include generating, in dependence on the static analysis of the program source code, caller binary code executable so that the at least one caller, in runtime, encodes pointer alias status into a tagged pointer.

In a further aspect the method can include generating, in dependence on the static analysis of the program source code, caller binary code executable so that the at least one caller, in runtime, encodes pointer alias status into a tagged pointer, where the runtime check for determining pointer alias status of the pointer operation callee includes the pointer operation callee, in runtime, decoding the pointer alias status.

In a further aspect the method can include generating, in dependence on the static analysis of the program source code, caller binary code executable so that the at least one caller, in runtime, encodes pointer alias status into a tagged pointer, where the runtime check for determining pointer alias status of the pointer operation callee includes the pointer operation callee, in runtime, decoding the pointer alias status, where the method includes generating, in dependence on the static analysis of the program source code, first and second alternative executable code paths, where the selecting and activating the executable code path in dependence on a result of the runtime check includes selecting and activating one of the first or second executable first and second alternative executable code paths in dependence on the result of the runtime check.

In another aspect, a computer program product can be provided. The computer program product can include a computer readable storage medium readable by one or more processing circuit and storing instructions for execution by one or more processor for performing a method. The method can include, for example: performing static analysis of program source code defining a computer program, where the computer program comprises a pointer operation callee and at least one caller that can pass a pointer parameter to the pointer operation callee; generating, in dependence on the static analysis of program source code, caller binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

In a further aspect, a system can be provided. The system can include, for example a memory. In addition, the system can include one or more processor in communication with the memory. Further, the system can include program instructions executable by the one or more processor via the memory to perform a method. The method can include, for example: performing static analysis of program source code defining a computer program, where the computer program comprises a pointer operation callee and at least one caller that can pass a pointer parameter to the pointer operation callee; generating, in dependence on the static analysis of program source code, binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
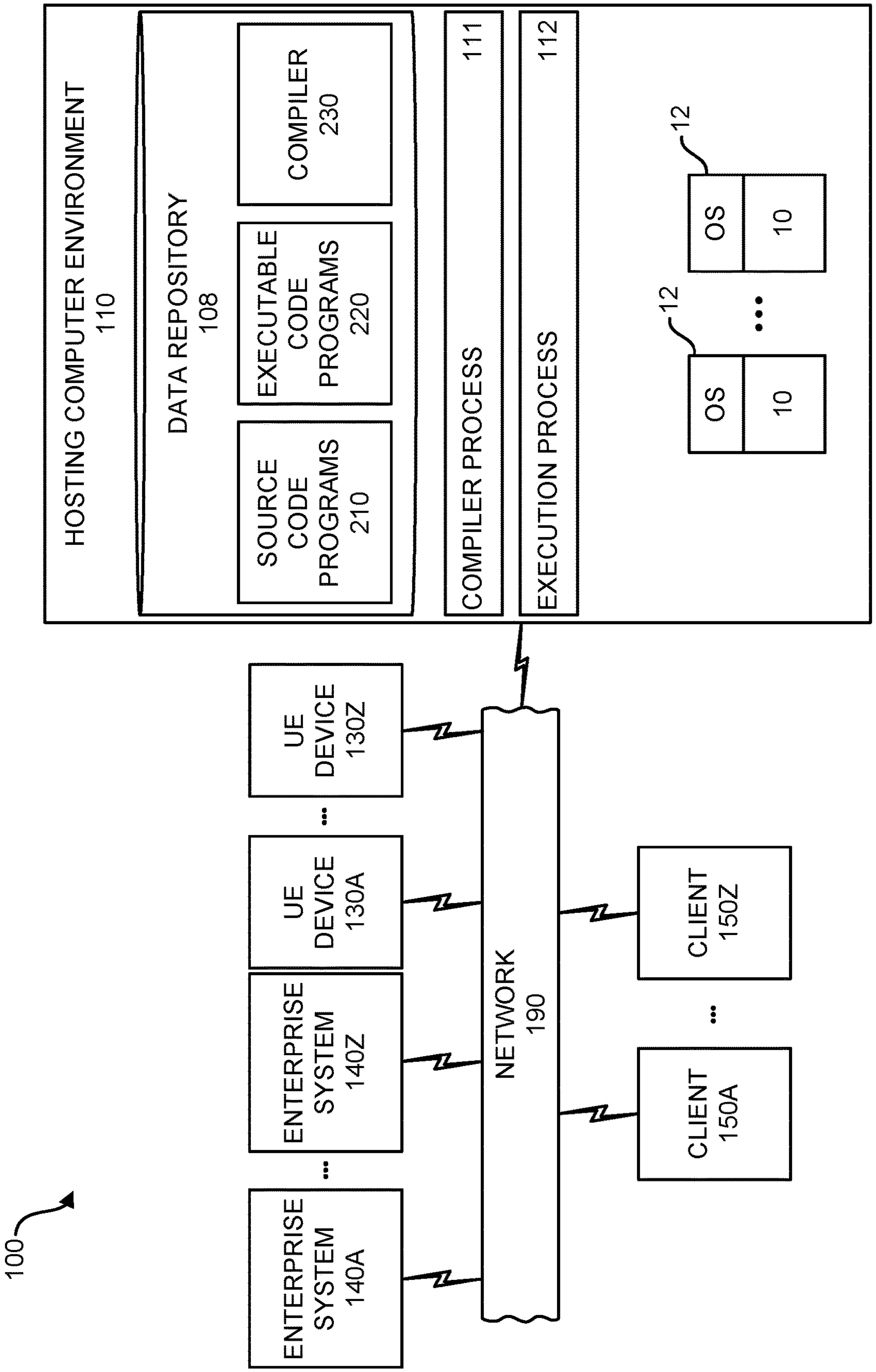
FIG. 1 depicts a system having a hosting computer environment, a plurality of user equipment (UE) devices, a plurality of enterprises, and a plurality of clients according to one embodiment.

In one aspect, embodiments herein can optionally include performing static analysis of program source code defining a computer program, where the computer program comprises a pointer operation callee and at least one caller that can pass a pointer parameter to the pointer operation callee; generating, in dependence on the static analysis of the program source code, binary code executable so that the pointer operation callee, in runtime, performs a runtime check for determining pointer alias status of the pointer operation callee; and generating, in dependence on the static analysis of the program source code, executable binary code executable so that the pointer operation callee, in runtime, performs selecting and activating an executable code path in dependence on a result of the runtime check. According to an example of a technical effect of the combination, an executing program can adapt in runtime for economized computing resource utilization based on a condition that can be unknown until runtime.

According to one optional feature, the method includes generating, in dependence on the static analysis of the program source code, caller binary code executable so that the at least one caller, in runtime, encodes pointer alias status into a tagged pointer. According to an example of a technical effect of the combination, an executing program can adapt in runtime for economized computing resource utilization based on a condition that can be unknown until runtime and a tagged pointer, in runtime, can be used to pass information on the condition.

According to one optional feature, the runtime check for determining the pointer alias status of the pointer operation callee includes the pointer operation callee, in runtime, decoding a pointer alias status that has been encoded into a tagged pointer. According to an example of a technical effect of the combination, an executing program can adapt in runtime for economized computing resource utilization based on a condition that can be unknown until runtime and a tagged pointer can be used to determine, in runtime, information on the condition.

According to one optional feature, the method includes generating, in dependence on the static analysis of the program source code, caller binary code executable so that the at least one caller, in runtime, encodes pointer alias status into a tagged pointer, where the runtime check for determining pointer alias status of the pointer operation callee includes the pointer operation callee, in runtime, decoding the pointer alias status. According to an example of a technical effect of the combination, an executing program can adapt in runtime for economized computing resource utilization based on a condition that can be unknown until runtime, and a tagged pointer can be used to pass and determine, in runtime, information on the condition.

According to one optional feature, the at least one caller includes first and second callers that can pass a pointer parameter to the pointer operation callee. According to an example of a technical effect of the combination, embodiments can include programs where one of a first or second caller can call a pointer operation callee.

According to one optional feature, the method includes generating, in dependence on the static analysis of the program source code, first and second alternative executable code paths. According to an example of a technical effect of the combination, a compiler can generate alternate code paths, to facilitate selection of one of the paths based on a condition that can be unknown until runtime.

According to one optional feature, the method includes generating, in dependence on the static analysis of the program source code, first and second alternative executable code paths, where the selecting and activating the executable code path in dependence on the result of the runtime check includes selecting and activating one of the first or second executable first and second alternative executable code paths in dependence on the result of the runtime check. According to an example of a technical effect of the combination, an executing program can adapt in runtime for economized computing resource utilization based on a condition that can be unknown until runtime. Further, for economized computing resource utilization in runtime based on the condition being determined, can include selection of a particular one of alternative code paths.

According to one optional feature, the method includes generating, in dependence on the static analysis of the program source code, caller binary code executable so that the at least one caller, in runtime, encodes pointer alias status into a tagged pointer, where the runtime check for determining pointer alias status of the pointer operation callee includes the pointer operation callee, in runtime, decoding the pointer alias status, where the method includes generating, in dependence on the static analysis of the program source code, first and second alternative executable code paths, where the selecting and activating the executable code path in dependence on a result of the runtime check includes selecting and activating one of the first or second executable first and second alternative executable code paths in dependence on the result of the runtime check. According to an example of a technical effect of the combination, an executing program can adapt in runtime for economized computing resource utilization based on a condition that can be unknown until runtime. Further, for economized computing resource utilization in runtime based on the condition being determined, can include selection of a particular one of alternative code paths, and a tagged pointer can be used to pass information on the condition in runtime.

According to one optional feature, the at least one caller includes first and second callers that can pass a pointer parameter to the pointer operation callee, where the method includes determining, based on the performing static analysis of program source code defining a computer program, that a pointer alias status of the pointer operation callee is dependent on which of the first or second callers calls the pointer operation callee in runtime. According to an example of a technical effect of the combination, an executing program can adapt in runtime for economized computing resource utilization based on a condition that can be unknown until runtime and the condition can involve which caller amongst alternative caller calls a callee in runtime.

According to one optional feature, the at least one caller includes first and second callers that can pass a pointer parameter to the pointer operation callee, where the method includes determining, based on the performing static analysis of program source code defining a computer program, that a pointer alias status of the pointer operation callee is dependent on which of the first or second callers calls the pointer operation callee in runtime, and where the generating the executable binary code executable so that the pointer operation callee, in runtime, performs the runtime check for determining pointer alias status of the pointer operation callee is performed responsively to the determining. According to an example of a technical effect of the combination, an executing program can adapt in runtime for economized computing resource utilization based on a condition that can be unknown until runtime and the condition can involve which caller amongst alternative caller calls a callee in runtime. Further, a compiler can generate executable binary code to perform a runtime check for the condition based on a determination at compile time that alias status, in runtime, can depend on which caller calls a pointer operation callee.

According to one optional feature, the at least one caller includes first and second callers that can pass a pointer parameter to the pointer operation callee, where the method includes determining, based on the performing static analysis of program source code defining a computer program, that a pointer alias status of the pointer operation callee is dependent on which of the first or second callers calls the pointer operation callee in runtime, and where the method includes responsively to the determining that the pointer alias status of the pointer operation callee is dependent on which of the first or second callers calls the pointer operation callee in runtime, (a) generating caller binary code executable so that the first and second callers, in runtime, can encode alias status of first and second pointers in a tagged pointer, (b) generating callee binary code executable so that the pointer operation callee, in runtime, performs a runtime check to decode the alias status of the first and second pointers encoded in the tagged pointer, (c) generating first and second alternative executable code paths, one executable code path for a "not aliased" alias status, and one executable code path for a "may aliased" alias status, and (d) generating callee executable binary code executable so that the pointer operation callee, in runtime, selects and activates one of the first or second alternative executable code paths in dependence on the alias status decoded from the tagged pointer. According to an example of a technical effect of the combination, an executing program can adapt in runtime for economized computing resource utilization based on a condition that can be unknown until runtime. Further, a compiler can generate executable code for passing alias status information in runtime, can generate alternate executable code paths, and can also generate executable code so that a callee in runtime, activates an appropriate one of the code paths in dependence on determined alias status information determined in runtime.

System 100 for use in optimizing executable code is shown in FIG. 1. System 100 can include host environment 110, having a data repository 108, UE devices 130A-130Z, enterprise systems 140A-140Z and clients 150A-150Z. Hosting environment 110 can be in communication with UE devices 130A-130Z, enterprise systems 150A-150Z and clients 140A-140Z via network. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

In one embodiment, hosting computer environment 110 can be external to each of UE devices 130A-130Z, enterprise systems 140A-140Z and clients 150A-150Z. In one embodiment hosting environment 110 can be collocated with one or more of UE devices 130A-130Z, enterprise systems 140A-140Z and clients 150A-150Z.

Hosting computer environment 110 can include one or more computing node 10 provided by a physical computing node. Each computing node 10 can host an operating system (OS) that runs on the computing node.

One or more computing node of computing nodes 10 can be configured as a manager computing node. In one embodiment, data repository 108 can be defined by a persistent storage device and/or working memory of such computing node 10 configured as a manager node.

Hosting computer environment 110 can include features for optimization of executable code. In one aspect, hosting environment 110 can, in compiling executable code from source code, identify alias status information between pointers and can generate first and second alternative executable code paths. In one aspect, hosting environment 110, in compiling executable code from source code, can generate binary code executable to encode alias status information into a tagged pointer. In one aspect, hosting environment 110, in compiling executable code from source code, can generate executable code that decodes the encoded alias status information from a tagged pointer and responsively selects one of the first or second alternative executable code paths.

Hosting computer environment 110 can include data repository 108 storing various data including source code programs 2121, executable programs 2122 and compiler 2123 which is an executable program configured to compile source code programs so that they define executable programs executable by an operating system (OS) 12.

Hosting computer environment 110 can run various processes including compiler process 111, and execution process 112.

Hosting computer environment running compiler process 111 can include hosting computer environment 110 performing analysis of a source code and generating therefrom executable code defining an executable program executable by an OS 12. Compiler 230 running compiler process 111 can include compiler 230 performing static analysis. Static analysis can include compiler 230 analyzing source code defining a program selected for compiling. Static analysis performed by compiler 230 can include performing static analysis to identify alias status of pointers. Embodiments herein recognize that pointer aliasing can occur in any computer language.

In one embodiment, compiler 230 can be configured so that where compiler 230 cannot determine that a first pointer and a second pointer are not aliased, compiler 230 can assign the alias status of "may aliased" to the pointers. Compiler 230 can assign the alias status of "may aliased" to pointers that may be aliased to one another and can assign the alias status of "not aliased" where the pointers are not aliased to one another.

Compiler 230 running compiler process 111 can determine that first and second pointers referenced in a callee have an alias status that depends on a caller that calls the callee. Compiler 230 running compiler process 111 can determine that when a first caller passing pointer parameters calls the callee, the first and second pointers have a status of "not aliased" and that when a second caller passing pointer parameters calls the callee, the pointers have a status of "may aliased". Where compiler 230 determines that an alias status ("not aliased" or "may aliased") of first and second pointers depends on which caller calls a callee to pass pointer parameters, compiler 230 can (a) generate caller binary code executable so that the caller in runtime encodes alias status of the first and second pointers in a tagged pointer, (b) generate callee binary code executable so that the callee in runtime performs a runtime check to decode the alias status of the first and second pointers encoded in the tagged pointer, (c) generate alternative executable code paths (one for the "not aliased" alias status, one for the "may aliased" alias status), and (d) generate callee binary code executable so that the callee in runtime selects and activates one of the first or second alternative executable code paths in dependence on the alias status decoded from the tagged pointer.

Hosting computer environment 110 running execution process 112 can include hosting computer environment 110 executing an executable program. In one example, hosting computer environment 110 running execution process 112 can include hosting computer environment 110 by an operating system (OS) 12 hosted by a computing node 10 executing an executable program performance of an in-production service. An OS 12 can execute an executable program directly or via a virtual machine (VM).

Compiler 230 performing pointer aliasing management is described further in reference to the source code segment of Table A.

TABLE A

```
void bar(int* b);
void foo(int *a, int *b)
{
// This cannot be eliminated
// as b may be aliased to a. a[0] = 10;
bar(b);
a[0] = 20;
}
```

In reference to the code segment of Table A, the function 'foo' includes pointer parameters to declare the pointers pointer 'a' and pointer 'b'. The syntax int *a declares pointer 'a' and the syntax int *b declares pointer 'b'. Further in reference to the code segment of Table A, the function 'bar' is called within the function 'foo'.

It can be seen with reference to the code segment of Table A that the code segment is absent of any information that precludes the possibility that pointer 'a' and pointer 'b' are not aliased to one another. Accordingly, compiler 2130 for conservative operation determines that pointer 'a' may be aliased pointer 'b' and can assign the status of "may aliased" to the pointer pair including pointer 'a' and pointer 'b'.

Figure 2:
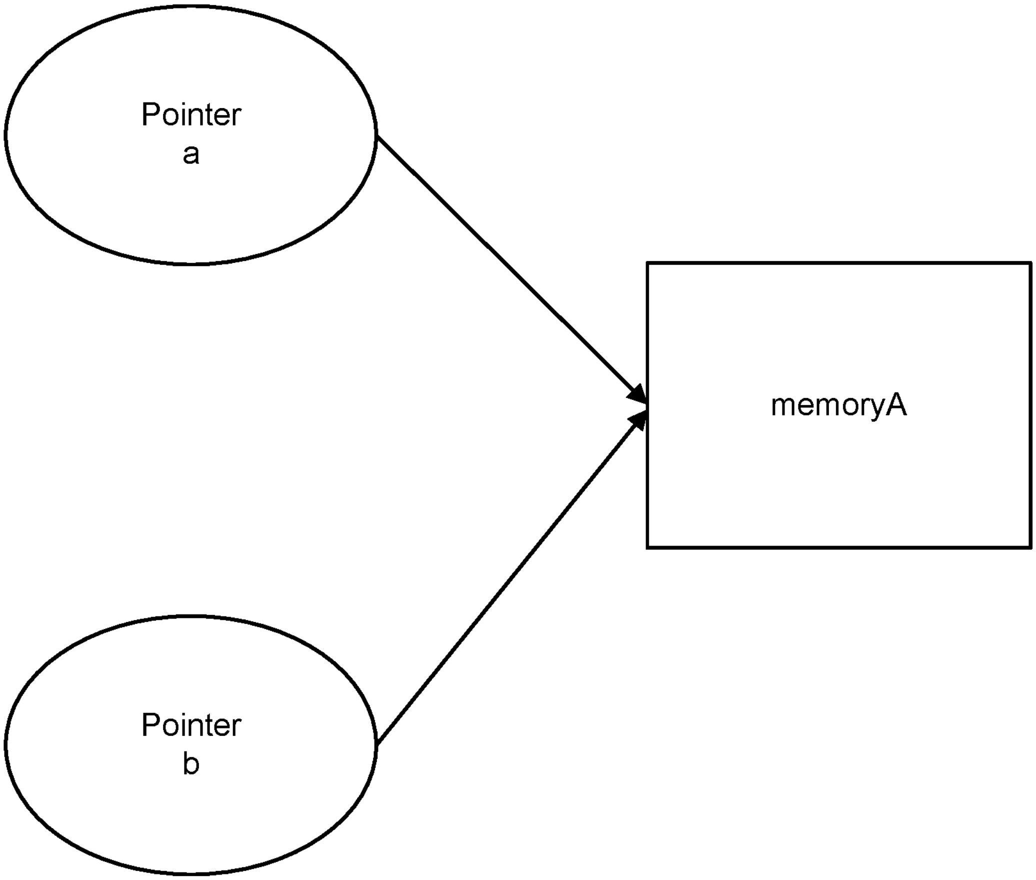
FIG. 2 is a diagram illustrating pointers at different pointer storage addresses pointing to a common pointing address according to one embodiment.

In further reference to the code segment of Table A, it is seen that within function 'foo' there is a first operation a[0]=10 to assign the integer value '10' to memory location a[0] which is the first memory location of an array of memory locations. Then, function bar (b) is called to declare pointer 'b' and then, after calling the function 'bar', the operation a[0]=20 is performed to set the value at memory location a[0] (which was previously set to the integer value 10) instead to the integer value 20. However, with the "may aliased" aliasing status being assigned to pointer 'a' and pointer 'b', pointer 'a' and pointer 'b' may point to the same memory address as shown graphically in FIG. 2.

Accordingly, for conservative aliasing aware management, compiler 230 can generate executable code that will retain and not remove the previously stored integer value '10' previously stored at the memory location a[0] when the operation a[0]=20 is performed. The aliasing management depicted with respect to Table A can increase memory consumption associated with code execution relative to a management method in which previously stored values are removed from memory locations when new values are stored thereto.

Table B depicts an alternative example of compiler 230 performing aliasing management.

TABLE B

```
void bar(int* b);
void foo(int * restrict a, int* restrict b)
{
// Now this store can be removed.
a[0] = 10;
bar(b);
a[0] = 20;
}
```

In Table B, the code segment defining the function 'fool' is the same as the code segment defining the function 'foo' in Table A except that restrict operations are associated to respective parameters for declaring pointer 'a' and pointer 'b'. Restrict operators described in reference to Table B preclude the possibility of the initialized pointers 'a' and 'b' being aliased to one another. Accordingly, in the example of Table B, compiler 230 can assign the alias status "not aliased" to the declared pointers 'a' and 'b' and can generate executable code executable to remove the integer value 10 from the memory location a[0] when the new integer value '20' is stored to the memory location a[0], thus improving computing resource utilization relative to the scenario described in reference to the code segment of Table A in which the originally stored integer value stored to the memory location a[0] was retained.

In the example described with reference to Table A, the pointer parameters passed to function 'foo' are the pointer declaring parameters int * a and int * b. Accordingly, in the example of Table A, compiler 230 cannot exclude the possibility of pointer 'a' being aliased to pointer 'b'. As such, in the example of Table A, compiler 230 can conservatively treat pointer 'a' and pointer 'b' as being possibly aliased and can assign the alias status "may aliased".

In the example of Table B, however, pointer declaring parameters passed to the function 'fool' are the parameters 'int * restrict a' and 'int *restrict b' respectively. Accordingly, in the example of code segment of Table B, compiler 230 can determine that the pointer 'a' and pointer 'b' are not aliased to one another and can assign pointers the alias status "not aliased". As such, in the example of Table B, compiler 230 can generate binary code executable to remove the integer value '10' from the pointed to pointer address a[0] when the new integer value '20' by the operation a[0]=20 is stored to the pointed to address location a[0].

Embodiments herein recognize that in some use cases, parameters that are passed to callees performing pointer operations, e.g., for storing data values to memory locations pointed to by a pointer, can depend on a condition. The condition can include, e.g., which one or more caller calls the callee.

In the code segment example of Table C, there is shown source code defining first and second alternative functions for calling the pointing address data value storing function 'foo' as set forth in Table A.

TABLE C

```
void caller1(int *a, int *b)
{
   foo(a, b);
}
void caller2(int * restrict a, int* restrict b)
{
foo(a, b);
}
```

Specifically, in Table C, there is shown source code defining the function 'caller1' which calls 'foo' and also source code for defining the function 'caller2' for calling the pointing address data value storing function 'foo'. In reference to the caller function 'caller1', the pointer declaring parameters int *a, int *b are passed to the callee function 'foo'. In the example of 'caller2', the pointer declaring parameters 'int * restrict' and 'int* restrict b' are passed to the callee function 'foo' of Table A.

Embodiments herein recognize whether or not pointer 'a' and pointer 'b' will be aliased in the scenario described in reference to Table C can depend on which caller function calls the callee function 'foo'. In the case that the caller function caller1 calls the callee function 'foo', pointer 'a' may be aliased to pointer 'b'. However, in the case that the caller function caller2 calls the callee function 'foo', pointer 'a' and pointer 'b', due to the "restrict" operation associated to caller2, will not be aliased to one another. Embodiments herein recognize that, in connection with the scenario depicted in Table C, which caller function calls 'foo' (caller1 or caller2) will not be known until runtime. Further, embodiments herein recognize that which caller performs calling (e.g., caller1 or caller 2 in Table C) in runtime can depend on a condition that can be unknown until runtime, e.g., configuration data defined by an administrator user, message data received from a client being serviced in runtime, and/or message data received from an enterprise system being serviced in runtime, and the like.

Embodiments herein include features to generate optimized resource conserving executable code. According to embodiments herein, compiler 230 can determine in runtime that a first pointer and a second pointer cannot be aliased after assigning, prior to runtime, the alias status "may aliased" to the first pointer and the second pointer. In response to the runtime determination that a first and second pointer are not aliased, the executing program can select a resource conserving executable code path for execution, e.g., executable code which in the described example of Table A and Table B, would remove and delete the integer value 10 from the memory location a[0] when the integer value 20 is stored to the memory location a[0].

Embodiments herein can employ a tagged pointer to pass down alias status information between pointer parameters. On the caller side compiler 230 can generate binary code executable in runtime to encode pointer alias status information into a tagged pointer so that a tagged pointer is passed in runtime to the callee instead of an original raw pointer. On the callee side, compiler 230 can generate binary code executable by the callee in runtime to decode the tagged pointer to obtain an alias status among pointer parameters and can generate alternate codes for both "not aliased" and "may aliased" alias statuses. In runtime, the executing callee can select and activate one or the alternative executable code paths in dependence on the decoded alias status.

Figure 3:
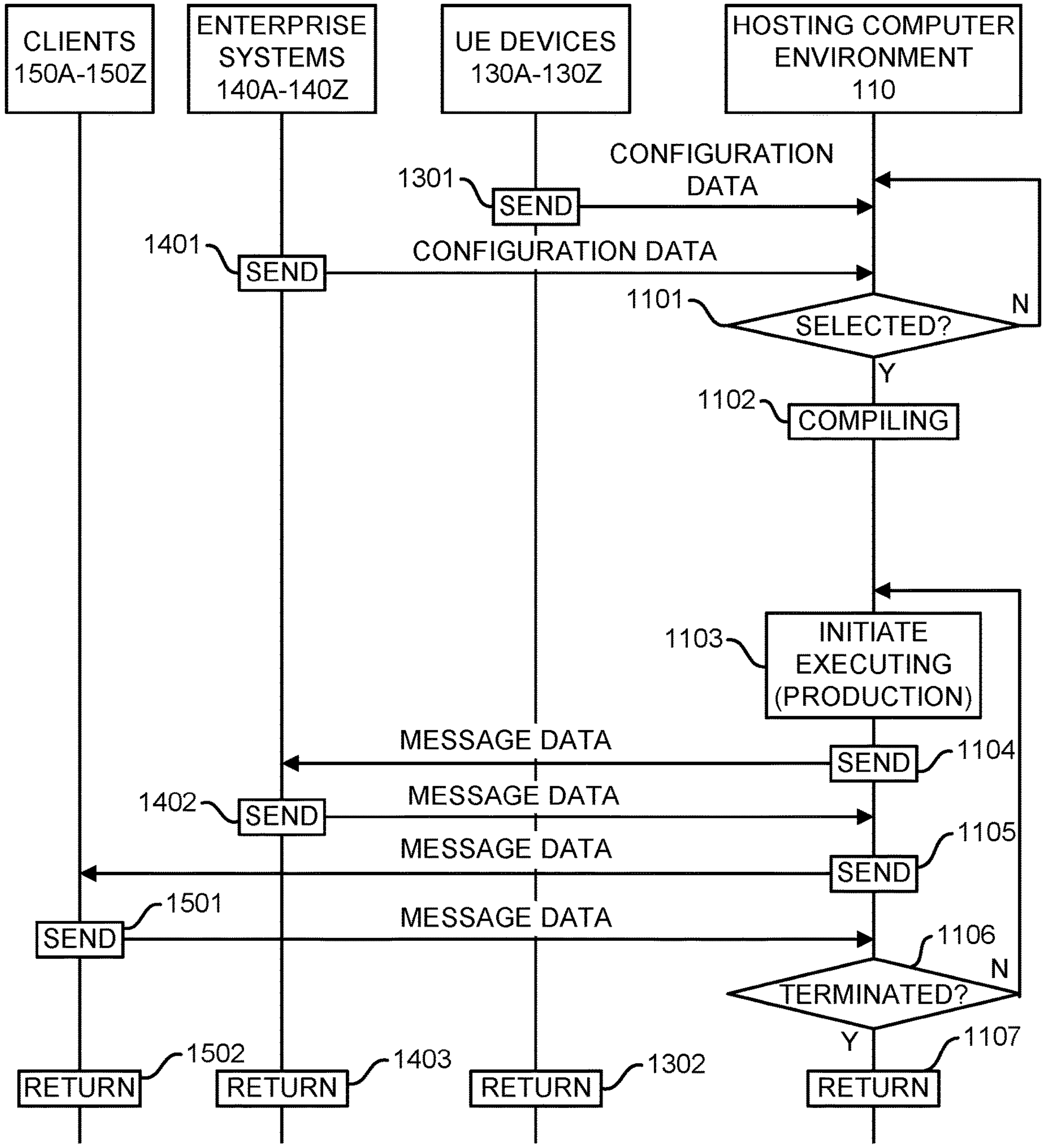
FIG. 3 is a flowchart illustrating a method for performance by a hosting computer environment interoperating with a plurality of user equipment (UE) devices, a plurality of enterprises, and a plurality of clients according to one embodiment.

A method for performance by hosting environment 110 interoperating with UE devices 130A-130Z, enterprise systems 140A-140Z and clients 150A-150Z is described in reference to FIG. 3. At block 1301 and block 1401, UE devices 130A-130Z and/or enterprise systems 140A-140Z can be sending configuration data.

UE devices 130A-130Z can be UE devices associated to various administrator users. Enterprise systems 140A-140Z can be enterprise systems operated by various enterprises that use services defined by executed programs executed by hosting environment 110. Configuration data sent at block 1301 and/or block 1401 can include configuration data that specifies, e.g., which one or more source code program source code to compile. Configuration data sent at block 1401 and/or block 1401 can also specify inputs that define attributes of operations of an executed program when executing.

On the receipt of the configuration data sent at block 1301 and/or block 1401, hosting environment 110 at decision block 1101 can determine whether a source code program has been selected for compiling. For a time that a source code program has not been selected for compiling, hosting environment 110 can iteratively consume addition configuration data sent at block 1301 and/or block 1401, until hosting environment 110 determines at block 1101 that a source code program has been selected for compiling. On determining that a source code has been selected for compiling, hosting environment can proceed to compiling block 1102.

At compiling block 1102, hosting environment 110 by running of compiler 230 can perform compiling of a selected source code program. For performing compiling at compiling block 1101, compiler 230 can activate compiler process 111 as set forth in FIG. 1.

A compiler set forth herein can refer to a computer program that translates computer code written in a programming language into executable code. Compiler 230 for performing compiling at block 1102 can include performance of various operations including preprocessing, lexical analysis, parsing, and semantic analysis. Compiler 230 can be implemented as a single pass compiler or multipass compiler.

Host computer environment 110 performing compiling at compiling block 1102 can include hosting environment 110 by compiler 130 performing static alias analysis. Static alias analysis is a technique in compiler theory used to determine if a storage location may be accessed in more than one way. First and second pointers are said to be aliased if they point to the same memory location. Static alias analysis at compiling block 1102 can include flow sensitivity analysis and context sensitivity analysis. Alias analysis performed at compiling block 1102 can include compiler 230 determining whether or not separate memory references point to the same memory location. This allows compiler 230 to determine what variables in a program may be impacted by a statement.

Figure 4:
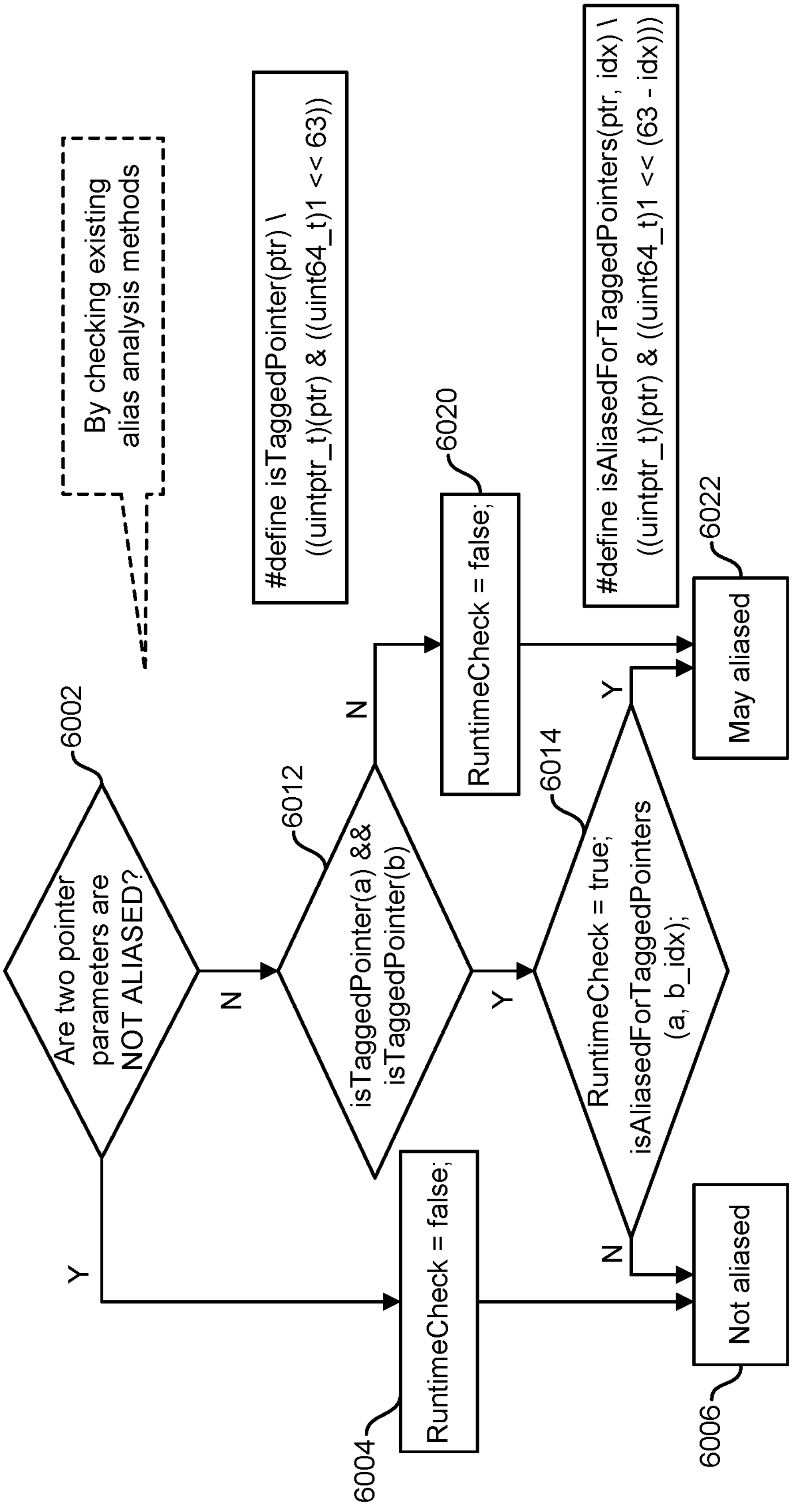
FIG. 4 is a flowchart depicting operations performed by a compiler according to one embodiment.
Figure 5:
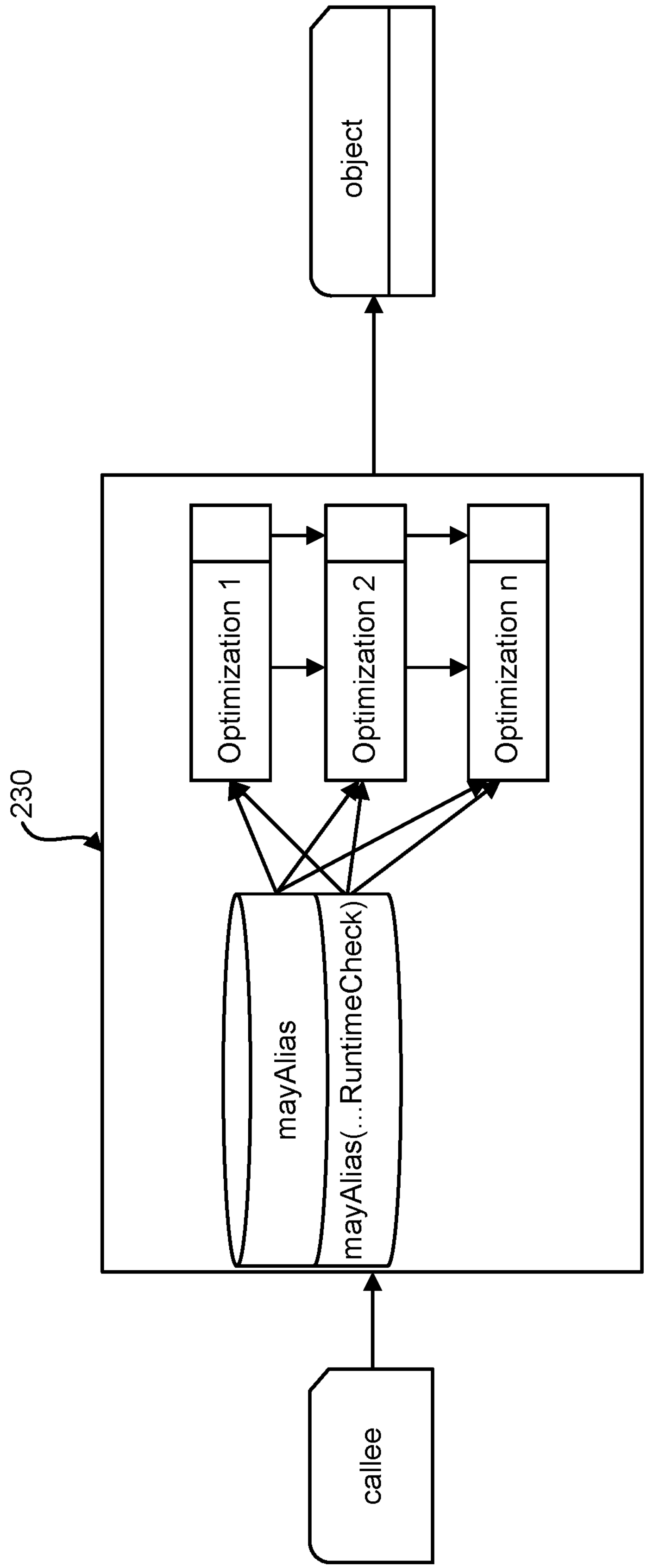
FIG. 5 is a diagram illustrating operations for performance by a compiler according to one embodiment.
Figure 6:
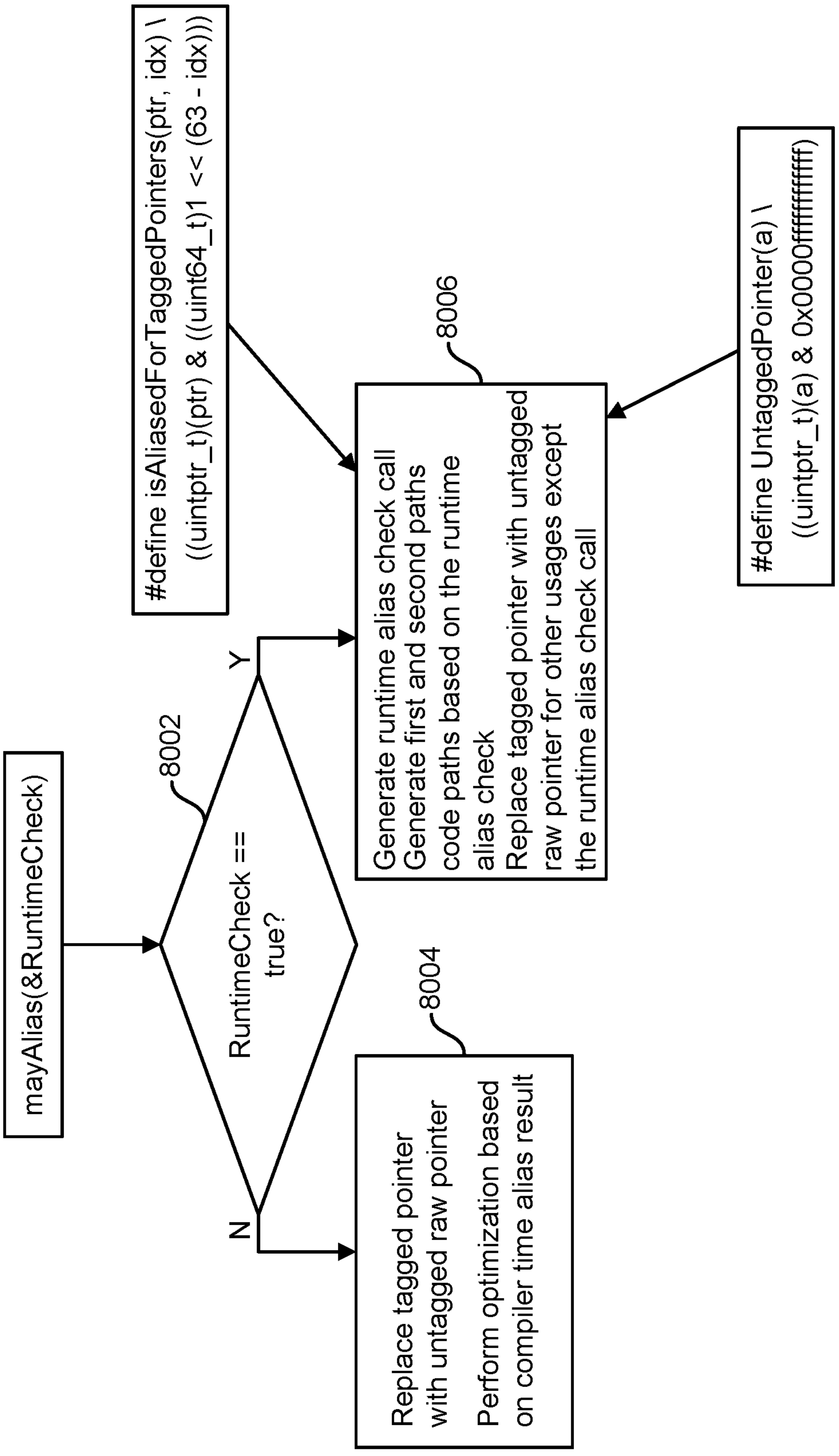
FIG. 6 is a flowchart depicting operations performed by a compiler according to one embodiment.

Processing performed by compiler 230 performing compiling at block 1102 is further described in reference to the flowcharts of FIGS. 4-6. Compiler 230 in performing compiling can perform static aliasing analysis. Compiler 230 in performing static aliasing analysis can include compiler 230 examining source code defining a pointer operation callee that performs one or more pointer operations (e.g., storing value to an address pointed to by a pointer), and, in addition, can include examining source code defining callers that call the pointer operation callee to pass pointer parameters to the callee. Based on the static analysis, compiler 230 can determine, under certain scenarios, that an alias status of a callee is dependent on which caller calls the callee. Where compiler 230 determines that an alias status of a callee is dependent on which caller calls the callee, compiler 230 can perform the following operations. Compiler 230 can: (a) generate caller binary code executable so that the caller in runtime encodes alias status of the first and second pointers in a tagged pointer, (b) generate callee binary code executable so that the callee in runtime performs a runtime check to decode the alias status of the first and second pointers encoded in the tagged pointer, (c) generate alternative executable code paths (one for the "not aliased" alias status, one for the "may aliased" alias status), and (d) generate callee binary code executable so that the runtime callee in runtime selects and activates one of the first or second alternative executable code paths in dependence on the alias status decoded from the tagged pointer.

Processing performed by compiler 230 in performing static alias analysis, in one embodiment, is set forth in reference to FIG. 4. At block 6002, compiler 230 can examine source code defining a pointer operation callee. If at block 6002, compiler 230 determines based on the source code defining the callee that pointers must have the status of "not aliased" compiler 230 can proceed to block 6004. Such a situation can occur, where in the case of the pointer operation function "fool" as shown in Table B, the callee includes "restrict" operation parameters. At block 6004, compiler 230 can set RuntimeCheck=false, meaning compiler 230 can avoid generating binary code executable to cause a runtime caller to perform a runtime check that includes decoding an alias status that has been encoded into a tagged pointer. On performance of block 6004, compiler 230 can proceed to block 6006 to assign the status of "not aliased" to the pointer operation callee based on the static analysis performed at the prior block 6002.

If at block 6002 compiler 230 is not able to determine via examination of source code defining the pointer operation callee that the pointer operation callee must have the pointer alias status of "not aliased", compiler 230 can proceed to block 6012. At block 6012, compiler 230 can examine source code defining the pointer operation callee and source code of all callers that can pass pointer parameters to the pointer operation callee, to determine whether the callee must have (independent the calling caller) the alias status "may alias". Such a scenario would occur, e.g., where all callers that can pass pointer parameters to the callee function "foo" of Table A pass pointer parameters having the pointer alias status of "may aliased". On determining at block 6012 that the callee must have the status of "may aliased" compiler 230 can proceed to block 6020. At block 6020, compiler 230 can set RuntimeCheck=false, meaning compiler 230 can avoid generating binary code executable to cause a runtime caller to perform a runtime check that includes decoding an alias status that has been encoded into a tagged pointer. On performance of block 6020, compiler 230 can proceed to block 6022 to assign the status of "may aliased" to the pointer operation callee based on the static analysis performed at the prior block 6012 and 6002.

As noted, compiler 230 at block 6012 can examine source code defining the pointer operation callee and source code of all callers that can pass pointer parameters to the pointer operation callee, to determine whether the callee must have (independent the calling caller) the alias status "may alias". Where compiler 230 at block 6012 determines that an alias status of a pointer referenced by the callee is dependent on which caller calls the callee, compiler 230 can proceed to block 6014.

At block 6014, compiler 230 can set a runtime check, and host computer environment 110 can subsequently determine based on the runtime check performed at runtime, the alias status of callee pointers referenced by the callee. For performance of a runtime check, compiler 230 at block 6014 can generate binary code executable to cause a runtime callee to perform a runtime check, where the runtime check includes decoding by the runtime callee an alias status that has been encoded into a tagged pointer. Where a runtime check is performed, the runtime callee on decoding the alias status "not aliased" from the tagged pointer can return the status of "not aliased" (block 6006). Where a runtime check is performed, the runtime callee on decoding the alias status "may aliased" from the tagged pointer can return the status of "may aliased" (block 6006).

As depicted in FIG. 5, compiler 230 can be configured to generate a runtime check. For generating a runtime check compiler 230 can generate binary code executable to cause a runtime callee to perform a runtime check, where the runtime check includes decoding by the runtime callee an alias status that has been encoded into a tagged pointer. Further as depicted in FIG. 5, the generating of a runtime check can be incorporated into one or more compiler optimizations in which alias analysis is performed. Compiler optimization that can include processing as set forth herein can include, e.g., load/store elimination, common subexpression elimination (CSE), Sink, Hoist, loop induction code motion (LICM), and/or instruction scheduling.

The flowchart of FIG. 6 depicts processing by compiler 230 in response to determining whether a runtime pointer operation callee will perform a runtime check on alias status.

At block 8002, compiler 230 can determine whether a runtime pointer operation callee will perform a runtime check on alias status as described according to the flowchart of FIG. 6. On determining at block 8002 that a runtime pointer operation callee will not perform a runtime check on alias status, compiler 230 can proceed to block 8004. At block 8004, compiler 230 can replace a tagged pointer with an untagged pointer, meaning the pointers referenced by the callee will perform according to normal pointer operation (e.g., to point to storage addresses as which data values are stored) without tagged pointer functionality. At block 8004, compiler 230 can perform optimization based on compiler time alias analysis without runtime performance being optimized via a runtime check on alias status by the runtime caller.

On determining at block 8002 that a runtime pointer operation callee will perform a runtime check on alias status, compiler 230 can proceed to block 8006. At block 8006, compiler 230 can perform various operations including generating a runtime alias check call. For generating a runtime alias check call, compiler 230 can generate callee executable code so that a runtime caller decodes pointer alias status that has been encoded into a tagged pointer by a runtime caller calling the callee. At block 8006, compiler 230 can generate first and second alternative executable code paths, a first "not aliased" executable code path, and a second "may aliased" executable code path. At block 8006, compiler 230 can replace the tagged pointer with an untagged raw pointer for other usages except the runtime alias check, meaning that the pointers referenced by a callee encoding alias status information can continue to perform their normal pointer functionality (e.g., to point to storage addresses as which data values are stored). At block 8006, compiler 230 in compiling the callee can generate callee binary code executable so that the callee in runtime performs a runtime check to decode the alias status of the first and second pointers encoded in the tagged pointer, can generate alternative executable code paths (one for the "not aliased" alias status, one for the "may aliased" alias status), and can generate callee binary code executable so that the callee in runtime selects and activates one of the first or second alternative executable code paths in dependence on the alias status decoded from the tagged pointer.

Figure 7A:
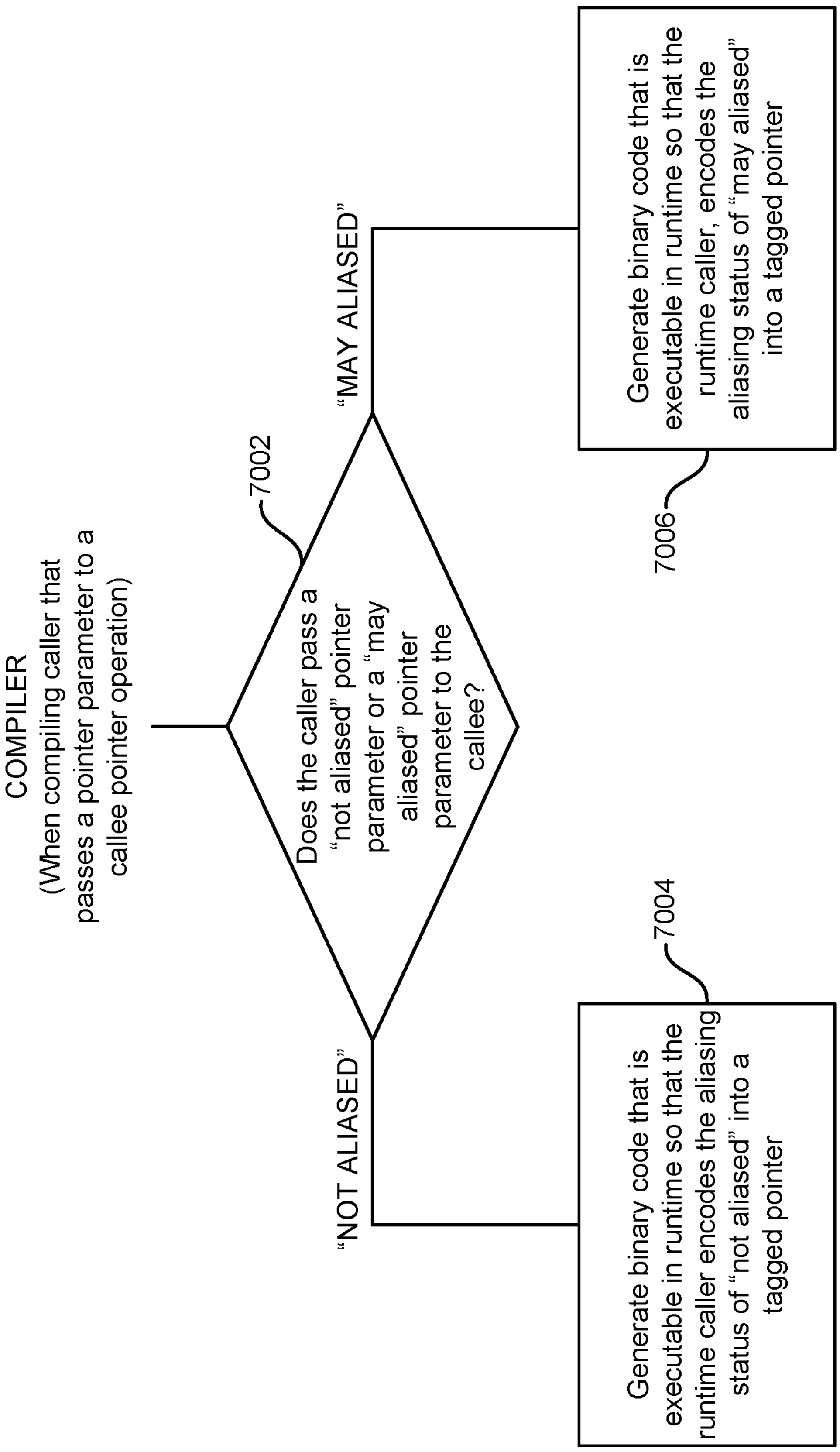
FIG. 7A is a flowchart depicting operations performed by a compiler according to one embodiment.
Figure 7B:
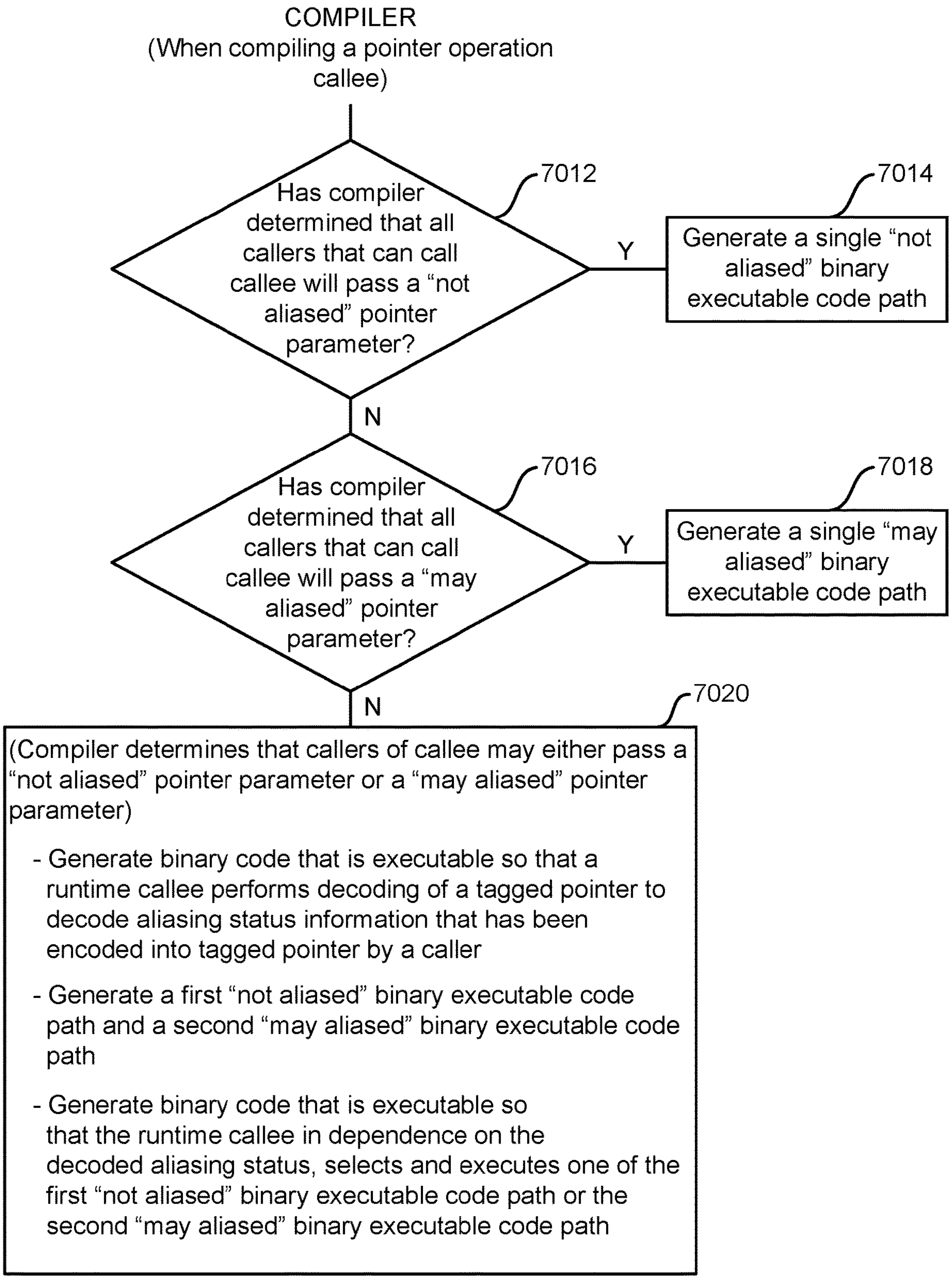
FIG. 7B is a flowchart depicting operations performed by a compiler according to one embodiment.

The flowcharts of FIGS. 7A and 7B depict executable code generation by compiler 130 according to one embodiment when compiling a pointer parameter passing caller (FIG. 7A) and pointer operation callee (FIG. 7B) that is called by the pointer parameter passing caller.

Operations of compiler 130 compiling the described pointer parameter passing caller are set forth in reference to FIG. 7A. At block 7002, compiler 230 can determine whether the caller will pass a "not aliased" pointer parameter or a "may aliased" pointer parameter to the pointer operation callee. On the determination at block 7002 that compiler 230 will pass a "not aliased" pointer parameter, compiler 230 can proceed to block 7004. At block 7004, compiler 230 can generate binary code executable so that the runtime caller encodes the aliasing status of "not aliased" into a tagged pointer. On the determination at block 7002 that compiler 230 will pass a "may aliased" pointer parameter, compiler 230 can proceed to block 7006. At block 7006, compiler 230 can generate binary code executable so that the runtime caller encodes the aliasing status of "may aliased" into a tagged pointer.

Operations of compiler 130 compiling the described callee are set forth in reference to FIG. 7B. At block 7012, compiler 130 by static analysis of callee and caller source code can determine whether all callers that can call a pointer operation callee will pass a "not aliased" pointer parameter. On the determination at block 7012 that all callers that can call the pointer operation callee will pass a "not aliased" pointer parameter, compiler 130 can proceed to block 7014. At block 7014, compiler 230 can generate a single "not aliased" binary executable code path, an executable code path which as described in connection with Table B will perform resource conserving operations such as removing old values from a memory location when new values are stored thereto based on the "not aliased" alias status of referenced pointers. Compiler 230 can also generate the single "not aliased" binary executable code path on the determination, e.g., prior to block 7012 that the callee pointer must be aliased based on static analysis of the callee source code, e.g., where the callee includes pointer parameters having "restrict" operators as set forth in reference to Table B.

On the determination at block 7012 that all callers that can call the pointer operation callee will not pass a "not aliased" pointer parameter, compiler 130 can proceed to block 7016.

At block 7016, compiler 230 can determine whether all callers that can call the pointer operation callee will pass a "may aliased" a pointer parameter. On the determination at block 7016 that all callers that can call the pointer operation callee will pass a "may aliased" pointer parameter, compiler 230 can proceed to block 7018. At block 7018, compiler 230 can generate a single "may aliased" binary executable code path, an executable code path which as described in connection with Table A will perform conservative aliasing aware operations such as maintaining and not old values from a memory location when new values are stored thereto based on the "may aliased" alias status of referenced pointers.

On the determination at block 7016 that all callers that can call the pointer operation callee will not pass a "may aliased" pointer parameter, compiler 230 can proceed to block 7020. Compiler 230 at block 7020 can determine that pointer parameter passing callers of the pointer operation callee may either pass a "not aliased" pointer parameter or a "may aliased" pointer parameter. Based on the determination that pointer parameter passing callers of the pointer operation callee may either pass a "not aliased" pointer parameter or a "may aliased" pointer parameter, compiler 230 can generate callee binary code executable so that the callee in runtime performs a runtime check to decode the alias status of the first and second pointers encoded in the tagged pointer, generate alternative executable code paths (one for the "not aliased" alias status, one for the "may aliased" alias status), and generate callee binary code executable so that the runtime callee in runtime selects and activates one of the first or second alternative executable code paths in dependence on the alias status decoded from the tagged pointer.

On completion of compiling block 1102 as shown in the flowchart of FIG. 3, hosting computer environment 110, can proceed to block 1103 to initiate executing of compiled binary program compiled at block 1102. Hosting computer environment 110 by the executing of the compiled program can send message data to enterprise systems 140A-140Z at block 1104 which can responsively return message data block 1403. Hosting computer environment 110 by the executing of the compiled program can send message data to clients 150A-150Z at block 1105 which clients 150A-150Z can responsively return message data block 1502. At block 1106 hosting computer environment 110 can determine whether the executing compiled program has terminated. For a time that the compiled program has not terminated the executing program can iteratively perform the loop of blocks 1103-1106. On the determination at block 1106 that the compiled program has terminated, hosting computer environment 110 can proceed to return block 1107. At return block 1107, hosting computer environment 110 can return to a stage preceding block 1101 to receive a next iteration of configuration data sent at block 1301 and 1401. Hosting computer environment 110 can iteratively perform the loop of block 1101-1107 for a deployment period of hosting computer environment 110. UE devices 130A-130Z can iteratively perform the loop of blocks 1301 to 1302 for the deployment period of UE devices 130A-130Z. Enterprise systems 140A-140Z can iteratively perform the loop of blocks 1401 to 1403 for the deployment period of enterprise systems 140A-140Z. Clients 150A-150Z can iteratively perform the loop of blocks 1501-1502 for a deployment period of clients 150A-150Z.

Embodiments herein recognize that which caller (e.g., caller1 or caller2 in Table C) performs calling in runtime can depend on a condition that can be unknown until runtime, e.g., configuration data defined by an administrator user as sent at block 1301, configuration data defined by an enterprise being serviced as sent at block 1401, message data received from a client being serviced in runtime as sent at block 1501, and/or message data received from an enterprise system being serviced in runtime as sent at block 1402, and the like.

Figure 8A:
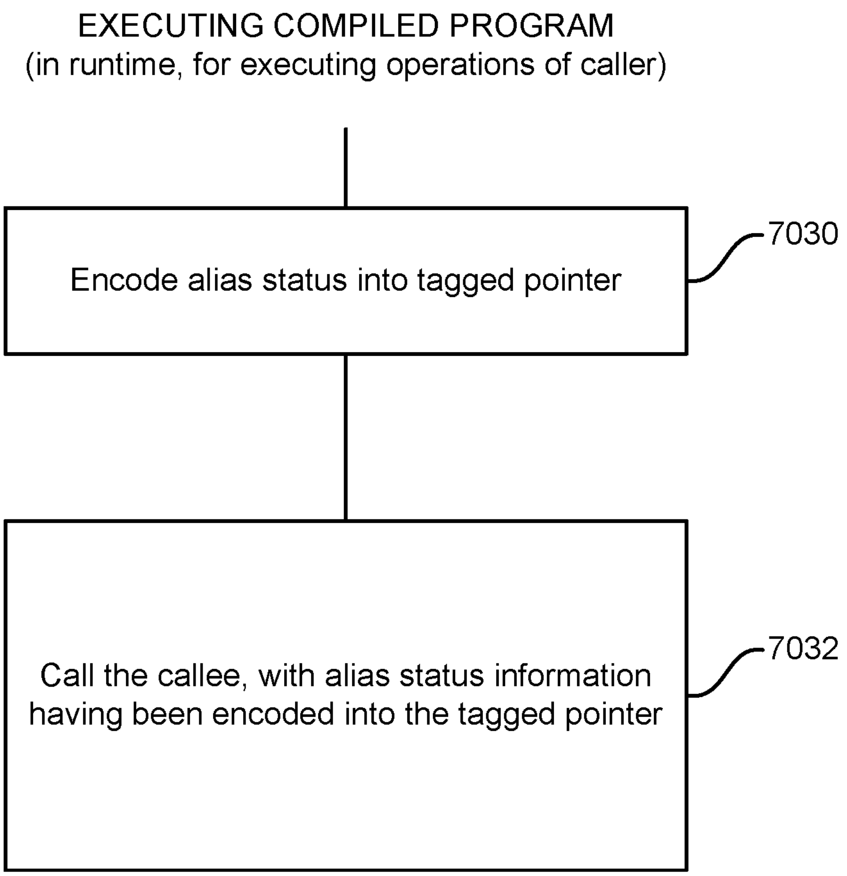
FIG. 8A depicts operations of a runtime caller executing in runtime according to one embodiment.
Figure 8B:
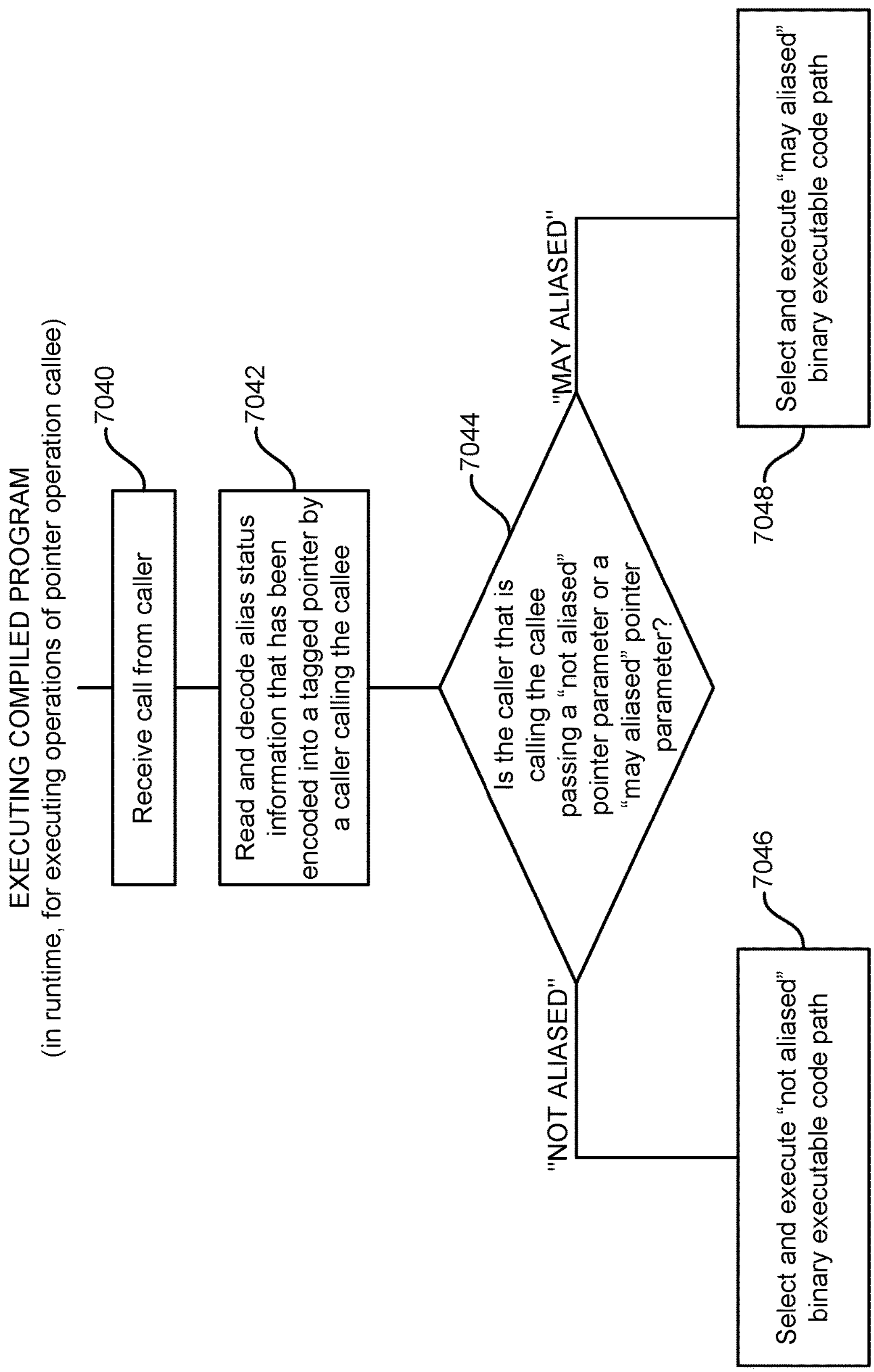
FIG. 8B depicts operations of a runtime caller executing in runtime according to one embodiment.

FIGS. 8A and 8B are flowcharts illustrating runtime operation of a runtime pointer parameter passing caller and pointer operation callee executing the generated binary code generated by compiler 230 as set forth in FIGS. 7A and 7B.

Referring to the flowchart of FIG. 8A, a runtime caller at block 7030 in passing a pointer parameter for a pointer can encode the compiler determined alias status for the caller, e.g., "not aliased" or "may aliased" into the pointer, where the pointer is configured as tagged pointer. As set forth herein, the runtime caller can encode the alias status into unused bits of the tagged pointer. At block 7032, the runtime caller can call a pointer operation callee, with the alias status encoded into the tagged pointer.

Referring to the flowchart of FIG. 8B, a runtime callee at block 7040 can receive a call from the runtime caller and can proceed to block 7042. At block 7042, the runtime callee can read and decode the alias status that has been encoded in the tagged pointer by the runtime caller (FIG. 8A) calling the pointer operation callee. On completion of block 7042, the runtime callee can proceed to decision block 7044. At block 7044, the runtime callee can determine based on the decoded alias status whether the caller calling the callee is passing a "not aliased" pointer parameter or a "may aliased" pointer parameter.

Embodiments herein employ tagged pointers to permit a runtime callee to activate differentiated binary code in dependence on a decoded alias status decoded from a tagged pointer, where the alias status has been encoded by a runtime pointer parameter passing caller that calls the pointer operation callee. By activating on demand "not aliased" code paths based on checks performed in runtime, embodiments herein can economize runtime computing resource utilization.

On the determination at block 7044 by the runtime callee decoding the encoded alias status that the runtime caller has encoded the alias status of "not aliased", the runtime callee can proceed to block 7046. At block 7046, the runtime callee can select and execute the "not aliased" binary executable code path (generated as described in connection with block 7020 of the flowchart of FIG. 7B). On the determination at block 7044 by the runtime callee decoding the encoded alias status that the runtime caller has encoded the alias status of "may aliased" the runtime callee can proceed to block 7048. At block 7048, the runtime callee can select and execute the "may aliased", binary executable code path (generated as described in connection with block 7020 of the flowchart of FIG. 7B).

By activating on demand the "not aliased" path at block 7046 based on a runtime check, the runtime callee can economize runtime computing resource utilization, e.g., computing resource economizing operations such as described in connection with Table B, where data values stored to a memory location can be removed on storage of a new value thereto.

Figure 9:
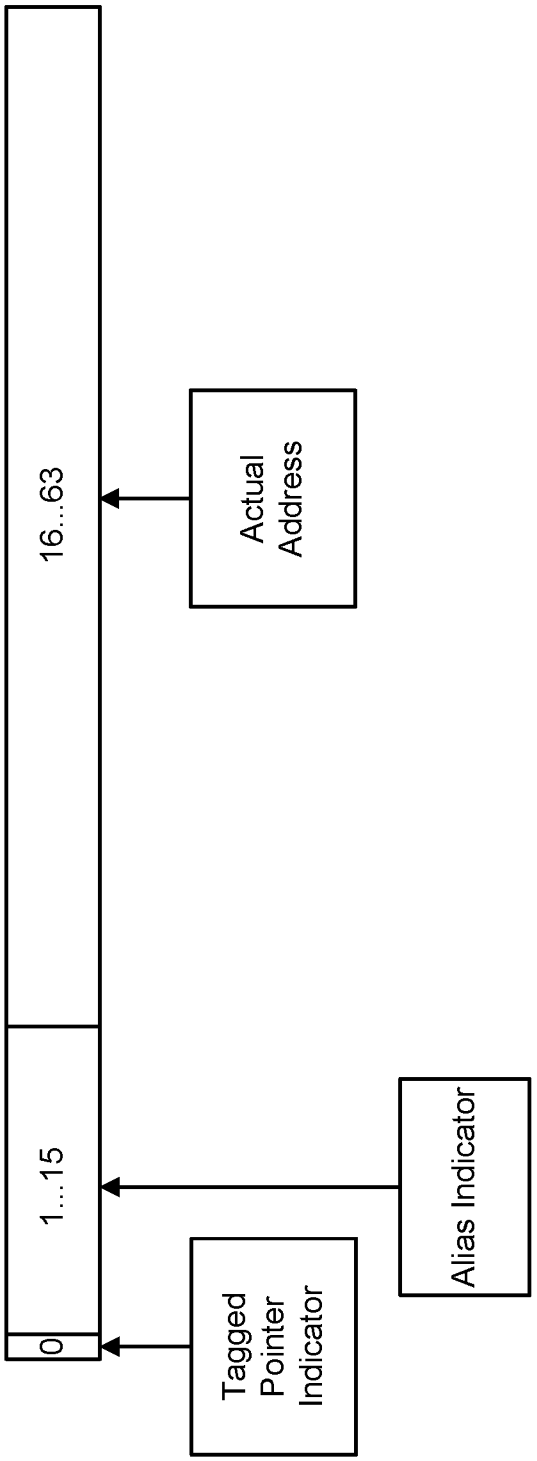
FIG. 9 depicts an architecture for a tagged pointer according to one embodiment.

FIG. 9 illustrates architecture for a tagged pointer encoding scheme according to one example. A tagged pointer, in one embodiment, can be a pointer (e.g., a memory address) with additional data associated. Additional data can be stored in the "unused" bits in a pointer. The "unused" bits can be caused, e.g., by pointer alignment. For example, for a pointer pointing to a 64-bit integer, the alignment for the 64-bit integer's memory is 8 bytes for most modern processors. Accordingly, the lowest 3 bits for the pointer are 0, so they can be treated as "unused".

For example, for X86_64 and ARM64, the high 16 bits can be regarded to be "unused" as these bits are not for the memory address. Assume the target is 64-bit: The high 16 bits are "unused" and the low 48 bits are the real address. The highest 1 bit can be used as the indicator for tagged pointer. The left 15 bits can be used to indicate alias relationship for at least 15 pointer parameters.

Figure 10A:
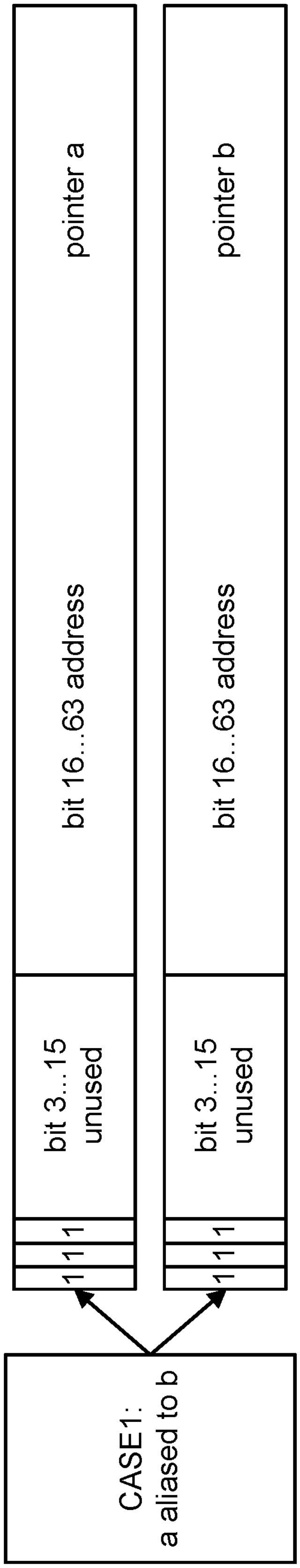
FIG. 10A depicts an encoding scheme for encoding a tagged pointer to include alias status information according to one embodiment.
Figure 10B:
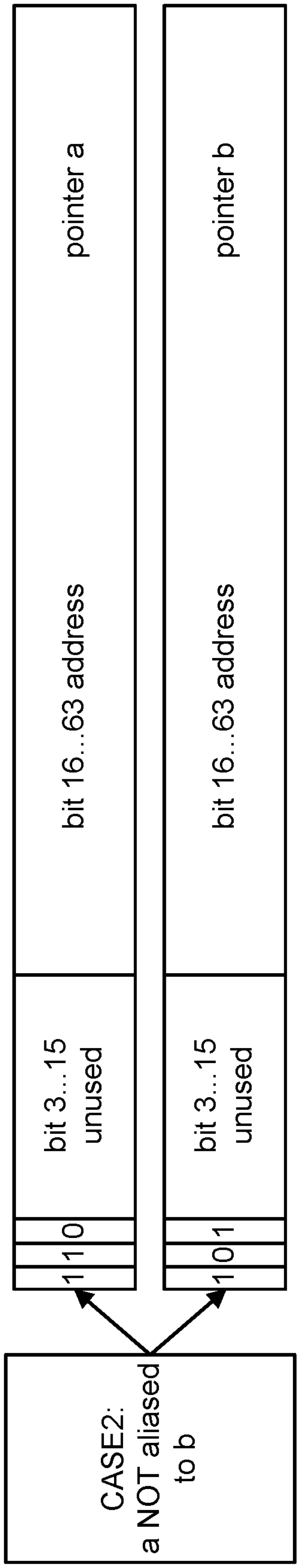
FIG. 10B depicts an encoding scheme for encoding a tagged pointer to include alias status information according to one embodiment.

A tagged pointer encoding scheme is set forth in reference to Table D in connection with FIGS. 10A and 10B.

TABLE D

| Aliased? | Pointer 1 (bit 1) | Pointer 2 (bit 2) | Pointer n (bit n) | Pointer 15 (bit 15) |
|---|---|---|---|---|
| Pointer 1 (bit 1) | True | N/A | N/A | N/A |
| Pointer 2 (bit 2) | N/A | True | N/A | N/A |
| Pointer n (bit n) | N/A | N/A | True | N/A |
| Pointer 15 (bit 15) | N/A | N/A | N/A | True |

Referring to Table D, aliasing status information for several pointers can be stored within unused bits of a memory address according to the architecture of FIG. 4. A tagged pointer can include bit "zero" which can serve as the tagged pointer indicator and bits 1 to 15, which can encode aliasing status data for 15 separate pointers. With reference to the encoding scheme depicted in Table D, embodiments herein recognize that a pointer is always aliased to itself.

Referring to the encoding scheme depicted in Table D, compiler 230 can generate tagged pointers. Compiler 230 can generate tagged pointers with use of the encoding scheme of Table D and the special case of Table D set forth in reference to Table E, where pointer 'a' maps to pointer 1 and pointer 'b' maps to pointer 2.

TABLE E

| Pointer | a | b |
|---|---|---|
| a | 1 | If a is aliased to b, fill 1, otherwise fill 0 |
| b | If a is aliased to b, fill 1, otherwise fill 0 | 1 |

In reference to FIGS. 10A and 10B, complier 230 can encode a "1" in bit zero, where the pointer is being encoded as a tagged pointer, and can encode a "0" in bit zero where the pointer is being encoded as a raw pointer.

For encoding the aliasing status of "pointer a is aliased to pointer b" compiler 230, e.g., when compiling a caller such as caller1 of Table C, can perform encoding as set forth in FIG. 5A. For encoding the aliasing status of pointer 'a' is "not aliased" to pointer 'b' compiler 230, e.g., when compiling a caller such as caller2 of Table C, can perform encoding as set forth in FIG. 10B.

Further aspects of compiler 230 are set forth in reference to Table F illustrating equivalent source code generated by compiler 230 when compiling a caller. Assembly code "compiler generates" when complier 230 compiles caller function source code as depicted in Table C are equal to the source code as depicted in Table F.

TABLE F

```
#define setAliasedBit(ptr, idx) ((uintptr_t)(ptr) | \
((uint64_t)1 << (63 - idx)) | ((uint64_t)1 <<63))
void call1(int*a, int *b)
{
// a and b may be aliased
int *Tagged_a = a;
int *Tagged_b = b;
// a is aliased to itself
Tagged_a = (int *)setAliasedBit(Tagged_a, 1);
// a may be aliased to a
Tagged_a = (int *)setAliasedBit(Tagged_a, 2);
// b may be aliased to a
Tagged_b = (int *)setAliasedBit(Tagged_b, 1);
// b is aliased to itself
Tagged_b = (int *)setAliaseddBit(Tagged_b, 2);
foo(tagged_a, Tagged_b);
}
void call2(int * restrict a,
int * restrict b) {
// a and b are not aliased
int *Tagged_a - a;
int *Tagged_b - b;
// a is aliased to itself
Tagged_a = (int *)setAliasedBit(Tagged_a, 1);
// b is aliased to itself
Tagged_b = (int *)setAliasedBit(Tagged_b, 2);
foo(Tagged_a, Tagged_b;
}
```

Assembly code "compiler generates" when complier 230 compiles callee function source code as depicted in Table A are equal to the source code as depicted in Table G.

TABLE G

```
#define UntaggedPointer(a) \
   ((uintptr_t)(a) & 0x0000ffffffffffff)
#define isAliasedForTaggedPointers(ptr, idx) \
   ((uintptr_t)(ptr) & ((uint64_t)1 << (63 - idx)))
Void bar (int* b);
_ _attribute_ _((noinline))
Void foo (int *a, int *b)
{
   // The raw pointers are used for normal
   // loads/stores.
   int* raw_a = (int *)UntaggedPointer(a);
   int* raw_b = (int *) UntaggedPointer(b);
//a index is 1, b index is 2
// Opt like Store Elimination will generate
// the runtime check and do the opt.
if (!isAliasedForTaggedPointers(a, 2))
   raw_a[0]=10;
bar (raw_b);
raw_a[0] = 20;
}
```

Certain embodiments herein may offer various technical computing advantages involving computing advantages to address problems arising in the realm of computer systems. Embodiments herein can include an optimizing compiler that optimizes runtime performance of a computer program. Embodiments herein can feature a compiler that performs static alias analysis and based on the static alias analysis generates binary code executable in runtime so that a runtime callee performs a runtime check for determination, in runtime, of alias status of the callee. In one embodiment, the alias status can be dependent on which caller has called the callee. In response to a determination, by a compiler in compile time, that a pointer operation callee's alias status can be dependent on which pointer parameter passing caller callers the callee, the compiler can perform one or more action. The one or more action can include generating binary code executable so that the pointer passing caller encodes a tagged pointer to specify an alias status of a pointer parameter being passed, generating binary code executable in runtime so that the callee in runtime performs a runtime check for determination of an alias status of the runtime callee, where the runtime check can comprise decoding of the encoded tagged pointer, generating alternative executable code paths, where respective ones of the alternative executable code paths are respectively associated to different alias statuses, and, generating binary code executable in runtime so that the callee in runtime selects and activates one of the alternative executable code paths in dependence on a result of the runtime check. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 11:
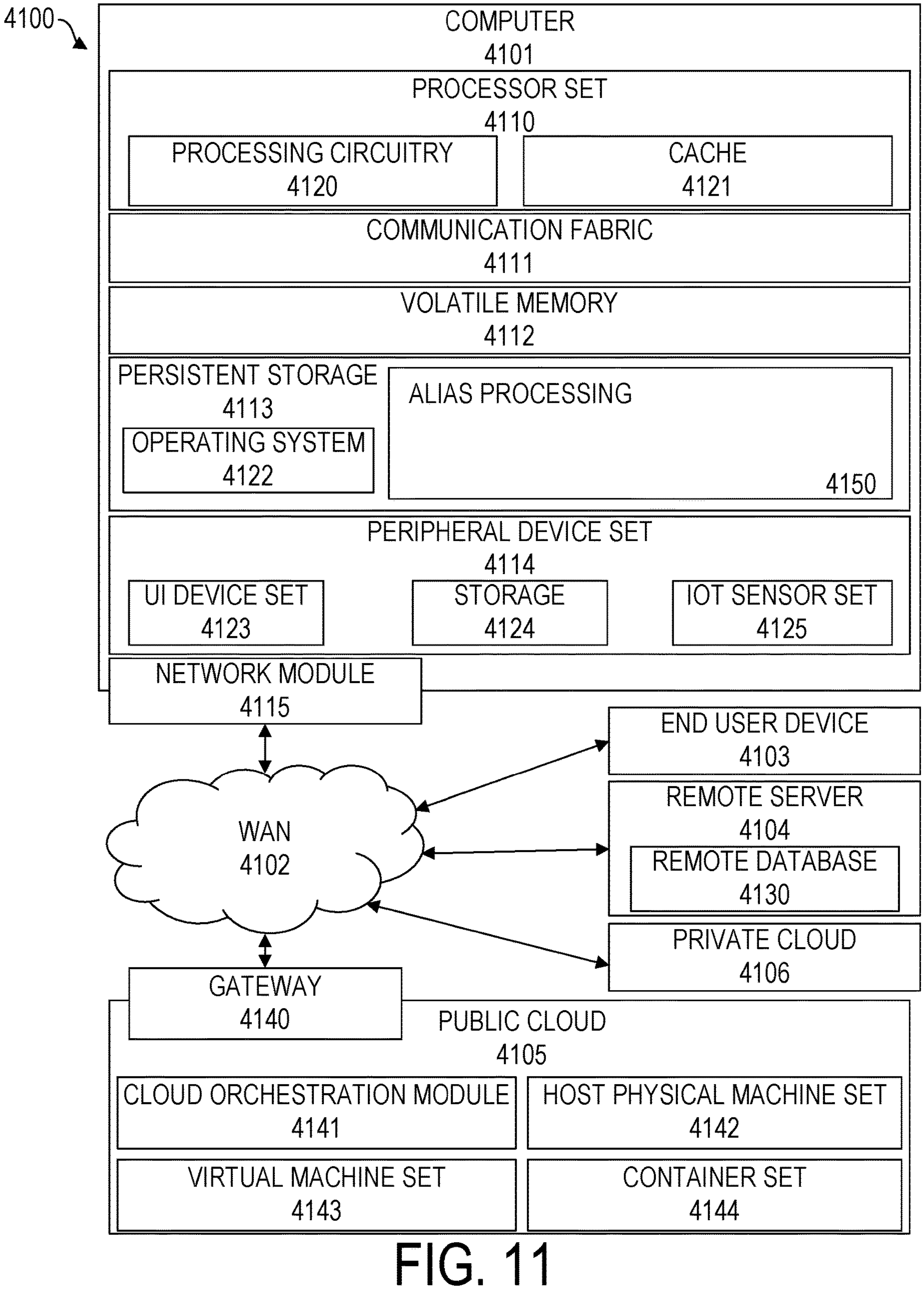
FIG. 11 depicts a computing environment according to one embodiment.

In reference to FIG. 11 there is set forth a description of a computing environment 4100 that can include one or more computer 4101. In one example, computing node 10 as set forth herein can be provided in accordance with computer 4101 as set forth in FIG. 11.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 11. In one aspect, a computing environment 4100 contains an example of an environment for the execution of at least some of the computer code involved in performing the inventive methods, such as code 4150 for performing alias processing described with reference to FIGS. 1-10B. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

performing static analysis of program source code defining a computer program, wherein the computer program comprises a pointer operation callee and at least one caller that can pass a pointer parameter to the pointer operation callee;

generating, in dependence on the static analysis of the program source code, binary code executable so that the pointer operation callee, in runtime, performs a runtime check for determining pointer alias status of the pointer operation callee; and generating, in dependence on the static analysis of the program source code, executable binary code executable so that the pointer operation callee, in runtime, performs selecting and activating an executable code path in dependence on a result of the runtime check.

2. The computer implemented method of claim 1, wherein the method includes generating, in dependence on the static analysis of the program source code, caller binary code executable so that the at least one caller, in runtime, encodes pointer alias status into a tagged pointer.

3. The computer implemented method of claim 1, wherein the runtime check for determining the pointer alias status of the pointer operation callee includes the pointer operation callee, in runtime, decoding a pointer alias status that has been encoded into a tagged pointer.

4. The computer implemented method of claim 1, wherein the method includes generating, in dependence on the static analysis of the program source code, caller binary code executable so that the at least one caller, in runtime, encodes pointer alias status into a tagged pointer, wherein the runtime check for determining pointer alias status of the pointer operation callee includes the pointer operation callee, in runtime, decoding the pointer alias status.

5. The computer implemented method of claim 1, wherein the at least one caller includes first and second callers that can pass a pointer parameter to the pointer operation callee.

6. The computer implemented method of claim 1, wherein the method includes generating, in dependence on the static analysis of the program source code, first and second alternative executable code paths.

7. The computer implemented method of claim 1, wherein the method includes generating, in dependence on the static analysis of the program source code, first and second alternative executable code paths, wherein the selecting and activating the executable code path in dependence on the result of the runtime check includes selecting and activating one of the first or second executable first and second alternative executable code paths in dependence on the result of the runtime check.

8. The computer implemented method of claim 1, wherein the method includes generating, in dependence on the static analysis of the program source code, caller binary code executable so that the at least one caller, in runtime, encodes pointer alias status into a tagged pointer, wherein the runtime check for determining pointer alias status of the pointer operation callee includes the pointer operation callee, in runtime, decoding the pointer alias status, wherein the method includes generating, in dependence on the static analysis of the program source code, first and second alternative executable code paths, wherein the selecting and activating the executable code path in dependence on a result of the runtime check includes selecting and activating one of the first or second executable first and second alternative executable code paths in dependence on the result of the runtime check.

9. The computer implemented method of claim 1, wherein the at least one caller includes first and second callers that can pass a pointer parameter to the pointer operation callee, wherein the method includes determining, based on the performing static analysis of program source code defining a computer program, that a pointer alias status of the pointer operation callee is dependent on which of the first or second callers calls the pointer operation callee in runtime.

10. The computer implemented method of claim 1, wherein the at least one caller includes first and second callers that can pass a pointer parameter to the pointer operation callee, wherein the method includes determining, based on the performing static analysis of program source code defining a computer program, that a pointer alias status of the pointer operation callee is dependent on which of the first or second callers calls the pointer operation callee in runtime, and wherein the generating the executable binary code executable so that the pointer operation callee, in runtime, performs the runtime check for determining pointer alias status of the pointer operation callee is performed responsively to the determining.

11. The computer implemented method of claim 1, wherein the at least one caller includes first and second callers that can pass a pointer parameter to the pointer operation callee, wherein the method includes determining, based on the performing static analysis of program source code defining a computer program, that a pointer alias status of the pointer operation callee is dependent on which of the first or second callers calls the pointer operation callee in runtime, and wherein the method includes responsively to the determining that the pointer alias status of the pointer operation callee is dependent on which of the first or second callers calls the pointer operation callee in runtime, (a) generating caller binary code executable so that the first and second callers, in runtime, can encode alias status of first and second pointers in a tagged pointer, (b) generating callee binary code executable so that the pointer operation callee, in runtime, performs a runtime check to decode the alias status of the first and second pointers encoded in the tagged pointer, (c) generating first and second alternative executable code paths, one executable code path for a "not aliased" alias status, and one executable code path for a "may aliased" alias status, and (d) generating callee executable binary code executable so that the pointer operation callee, in runtime, selects and activates one of the first or second alternative executable code paths in dependence on the alias status decoded from the tagged pointer.

12. A system comprising:

a memory;

at least one processor in communication with the memory; and program instructions executable by one or more processor via the memory to perform a method comprising:

performing static analysis of program source code defining a computer program, wherein the computer program comprises a pointer operation callee and at least one caller that can pass a pointer parameter to the pointer operation callee;

generating, in dependence on the static analysis of program source code, binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

13. The system of claim 12, wherein the method includes generating, in dependence on the static analysis of the program source code, caller binary code executable so that the at least one caller, in runtime, encodes pointer alias status into a tagged pointer.

14. The system of claim 12, wherein the runtime check for determining the pointer alias status of the pointer operation callee includes the pointer operation callee, in runtime, decoding a pointer alias status that has been encoded into a tagged pointer.

15. The system of claim 12, wherein the method includes generating, in dependence on the static analysis of the program source code, caller binary code executable so that the at least one caller, in runtime, encodes pointer alias status into a tagged pointer, wherein the runtime check for determining pointer alias status of the pointer operation callee includes the pointer operation callee, in runtime, decoding the pointer alias status.

16. The system of claim 12, wherein the at least one caller includes first and second callers that can pass a pointer parameter to the pointer operation callee.

17. The system of claim 12, wherein the method includes generating, in dependence on the static analysis of the program source code, first and second alternative executable code paths.

18. The system of claim 12, wherein the method includes generating, in dependence on the static analysis of the program source code, first and second alternative executable code paths, wherein the selecting and activating the executable code path in dependence on the result of the runtime check includes selecting and activating one of the first or second executable first and second alternative executable code paths in dependence on the result of the runtime check.

19. The system of claim 12, wherein the method includes generating, in dependence on the static analysis of the program source code, caller binary code executable so that the at least one caller, in runtime, encodes pointer alias status into a tagged pointer, wherein the runtime check for determining pointer alias status of the pointer operation callee includes the pointer operation callee, in runtime, decoding the pointer alias status, wherein the method includes generating, in dependence on the static analysis of the program source code, first and second alternative executable code paths, wherein the selecting and activating the executable code path in dependence on a result of the runtime check includes selecting and activating one of the first or second executable first and second alternative executable code paths in dependence on the result of the runtime check.

20. A computer program product comprising:

a computer readable storage medium readable by one or more processing circuit and storing instructions for execution by one or more processor for performing a method comprising:

performing static analysis of program source code defining a computer program, wherein the computer program comprises a pointer operation callee and at least one caller that can pass a pointer parameter to the pointer operation callee;

generating, in dependence on the static analysis of program source code, binary code executable so that the pointer operation callee, in runtime, performs a runtime check for determining pointer alias status of the pointer operation callee; and generating, in dependence on the static analysis of program source code, executable binary code executable so that the pointer operation callee, in runtime, performs selecting and activating an executable code path in dependence on a result of the runtime check.

* * * * *